United States Patent [19]

Meyer et al.

[11] 4,362,441
[45] Dec. 7, 1982

[54] MEANS AND APPARATUS FOR THROTTLING A DRY PULVERIZED SOLID MATERIAL PUMP

[75] Inventors: John W. Meyer, Palo Alto; Arnold D. Daniel, Jr., Alameda County; John H. Bonin, Sunnyvale, all of Calif.

[73] Assignee: Lockheed Missiles & Space Company, Inc., Sunnyvale, Calif.

[21] Appl. No.: 199,861

[22] Filed: Oct. 23, 1980

Related U.S. Application Data

[63] Continuation-in-part of Ser. No. 36,578, May 7, 1979, abandoned.

[51] Int. Cl.³ ...................... B65G 53/40; B65G 53/66
[52] U.S. Cl. .................................... 406/14; 406/71; 406/98; 406/99; 414/217; 417/71
[58] Field of Search ............................. 415/116, 117; 60/39.46 S; 406/14, 93, 94, 71, 99, 98, 52; 414/217; 239/423, 433; 417/71, 900

[56] References Cited

U.S. PATENT DOCUMENTS

| | | | |
|---|---|---|---|
| 3,182,825 | 5/1965 | Zellerhoff | 414/217 |
| 3,389,938 | 6/1968 | Frazier | 406/14 |
| 3,424,386 | 1/1969 | Maasberg et al. | 239/433 X |
| 4,265,580 | 5/1981 | Meyer | 239/224 X |

FOREIGN PATENT DOCUMENTS 2816316 12/1978 Fed. Rep. of Germany ...... 414/217

Primary Examiner—Carlton R. Croyle
Assistant Examiner—Edward Look
Attorney, Agent, or Firm—H. Donald Volk

[57] ABSTRACT

Method and apparatus are shown for control of continuous feeding of pulverized material to a high pressure container. A rotor is located within the high pressure container. The pulverized material is fed from a feed hopper through a stationary feed pipe to a vented spin-up zone chamber to a plurality of sprues mounted in the rotor. Control of the pressure within control nozzles downstream from the sprues adjusts the flow rate of coal through the sprues.

10 Claims, 9 Drawing Figures

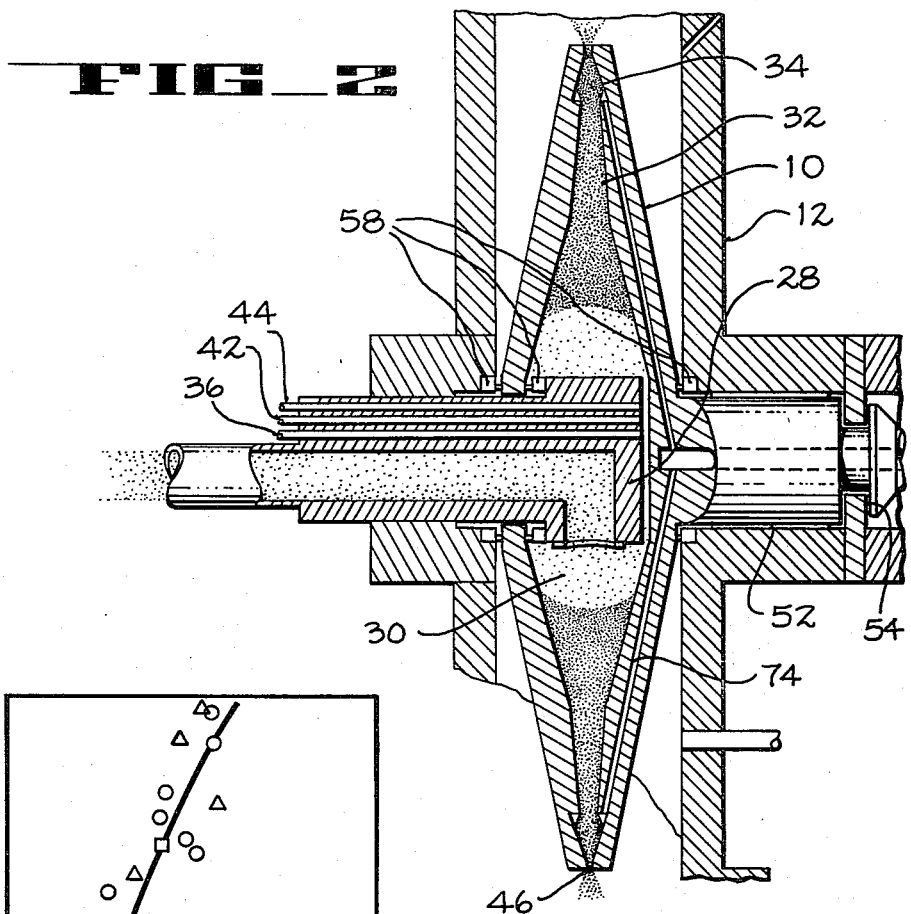
FIG_2
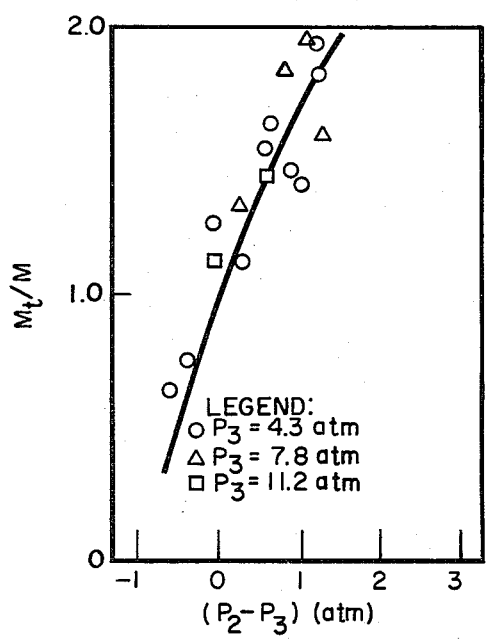
FIG_4
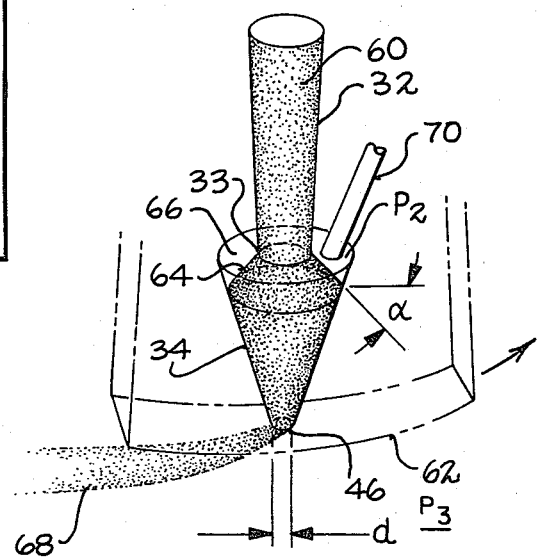
FIG_3

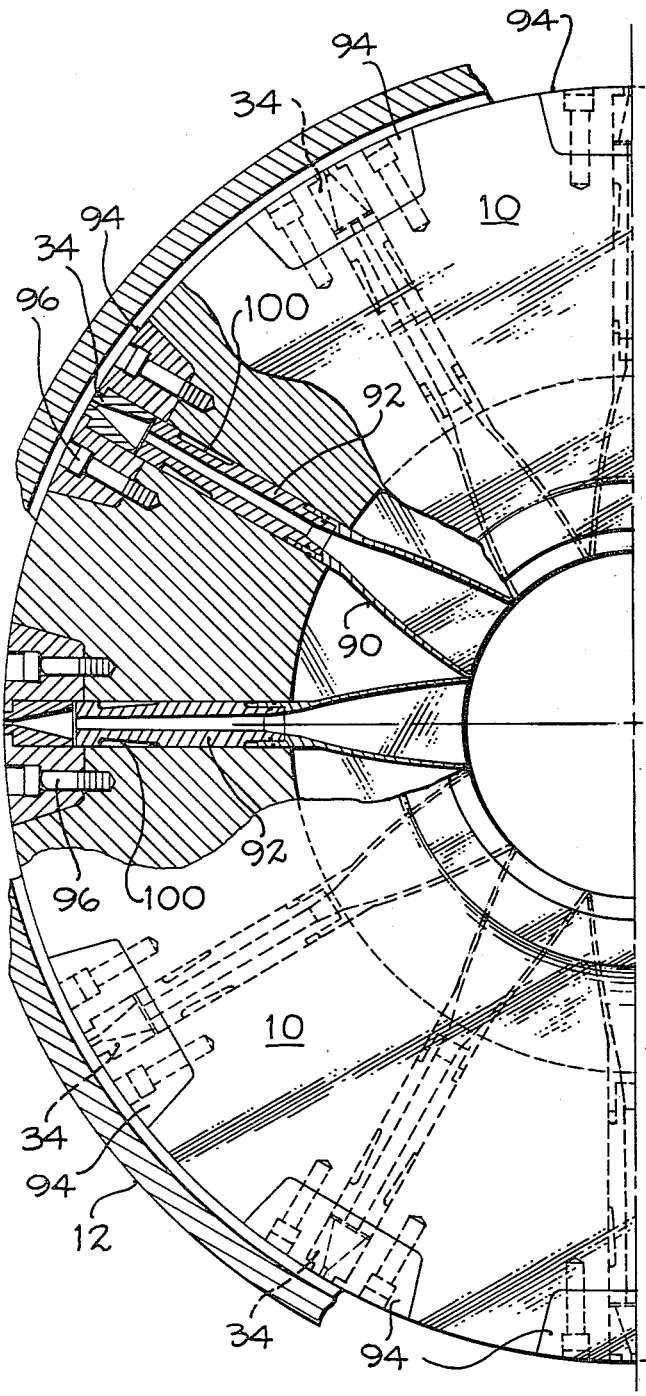
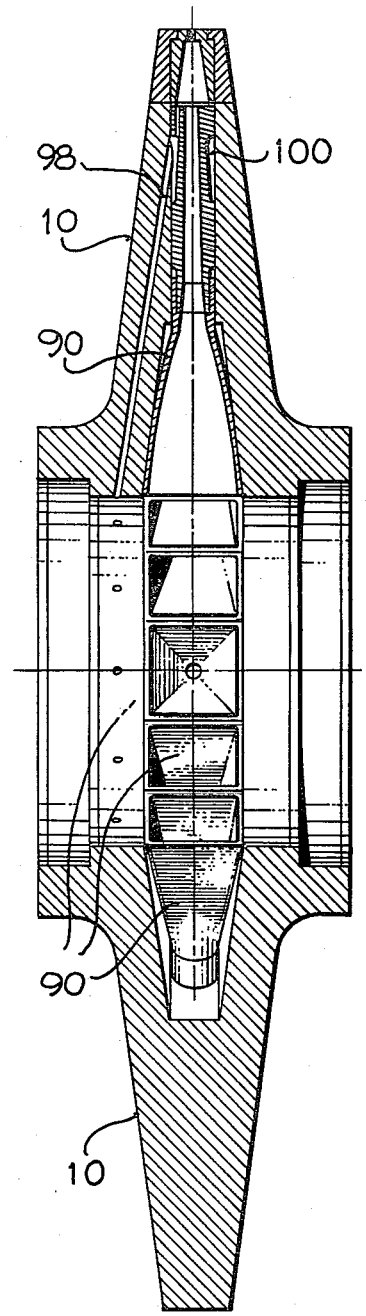
FIG_5  FIG_6

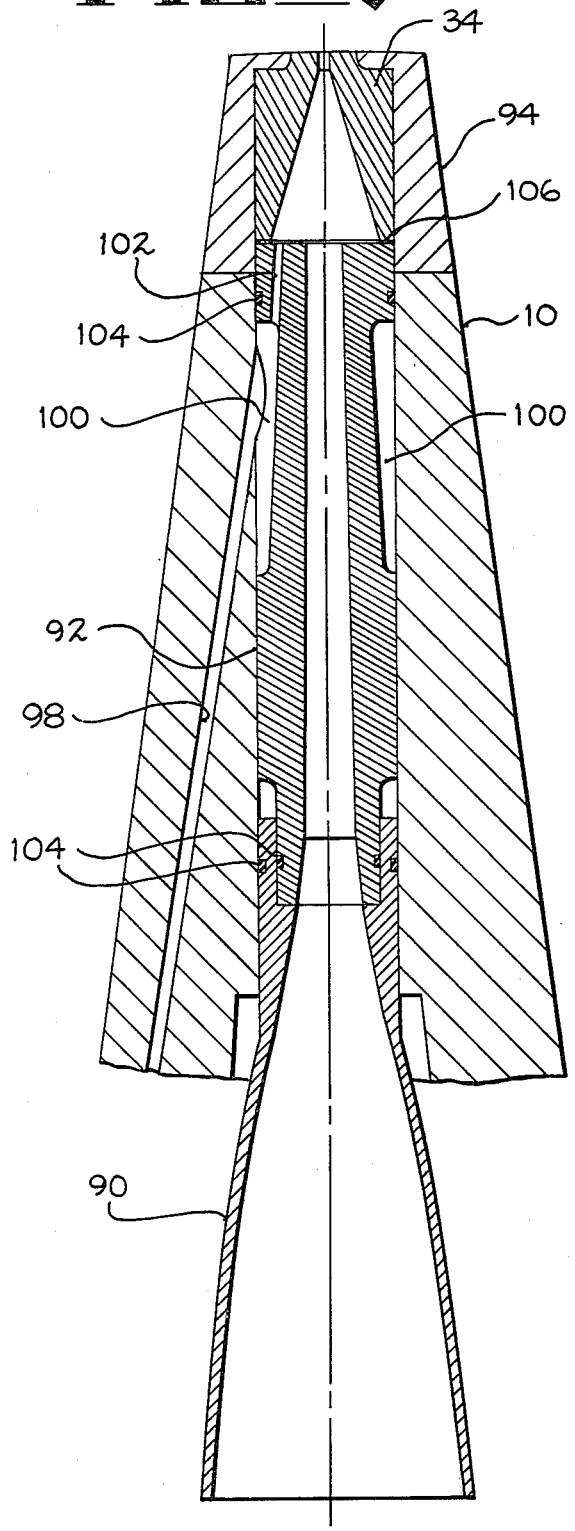
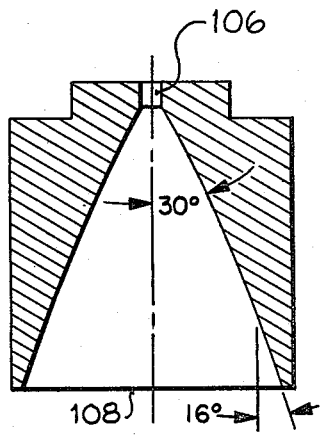
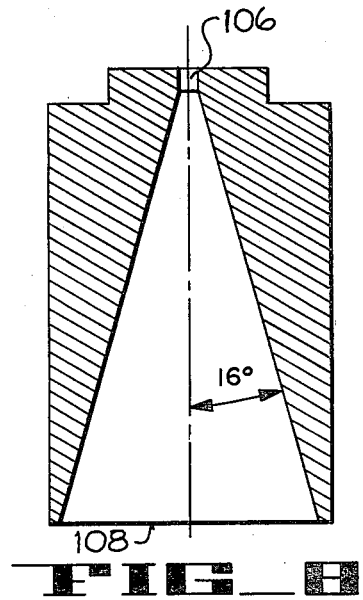

MEANS AND APPARATUS FOR THROTTLING A DRY PULVERIZED SOLID MATERIAL PUMP

The Government has rights in this invention pursuant to Contract EX76-C-01-1792 awarded by the Department of Energy.

This is a continuation-in-part of application Ser. No. 36,578 filed May 7, 1979, now abandoned.

TECHNICAL FIELD

It is noted in co-pending U.S. patent application Ser. No. 188,047 (a continuation-in-part of U.S. patent application Ser. No. 32,646, now abandoned) entitled "The Kinetic Extruder—A Dry Pulverized Solid Material Pump," assigned to the same assignee as the present patent application and co-pending U.S. patent application Ser. No. 32,651, now U.S. Pat. No. 4,265,580, entitled "A System for Throttling and Compensation for Variable Feedstock Properties," assigned to the same assignee as the present application, there are a number of industrial processes which require the feeding of solid material from a lower atmospheric pressure environment to the elevated pressure environment within the working vessel. As is noted in these co-pending patent applications, one such process is coal gasification. Coal gasification processes generate combustible gases by pyrolzing pulverized or powdered coal at elevated temperatures and pressures. The invention covered by the aforementioned applications is for a centrifugal machine for feeding dry pulverized solid material into a high pressure gaseous environment (e.g., 5-100 atm).

BACKGROUND ART

The prior art in current use in this area is either the slurry feed method or a batch process commonly known as the lockhopper feed method. In the slurry feed method, a liquid-solid mixture is pumped into the pressure vessel using more or less conventional pumps. With this arrangement the liquid required to transport the solid material may not be required in the process and may reduce process efficiency or require considerable effort to be removed before processing can begin. The previous dry feeding arrangement, the lockhopper method, is to load the material into a hopper, close and pressurize the hopper with gas, and then dump the material into the pressure vessel. The hopper remains filled with high pressure gas which must be vented in readying the hopper for the next load of material. Such venting and batch feeding of material is not desirable. Large valves at the inlet and outlet of the hopper are required; such valves, operating cyclically in the environment of pulverized solids, are generally known to have poor life and reliability.

The heart of the Kinetic Extruder invention by the above-cited co-pending patent applications is a high speed rotor that contains many converging radial channels or "sprues." Pulverized material is transported into the eye of the rotor and is centrifuged outward into the sprues. A porous compacted moving plug of the particulate material forms in the sprues and creates a seal against the high-pressure gases. The sealing action is a combined effect of both the motion of the plug and its relatively low permeability. A control nozzle structure at the distal end of the sprues acts to stabilize the moving material plug and control its outward velocity to the proper value for effective sealing.

The previous applications covering the Kinetic Extruder did not include satisfactory means to vary the mass flow of material through the Kinetic Extruder over a wide range. The ability to "throttle" the Kinetic Extruder would increase its applicability since many processes where it might be used require allowance for wide feed mass flow variations.

DISCLOSURE OF INVENTION

The present invention provides a method and apparatus capable of controlling and adjusting the amount of solid material fed from a low pressure container into a pressurized container. This result is achieved by using a rotor that includes, among other things, a plurality of generally radial-extending channels through which the pulverized or particulated material passes. Each channel consists of a sprue section followed by a control nozzle section at the distal end of the sprue. A significant attribute of this structure relates to the successful separation of the pressure sealing function, which takes place in the sprue channel, from the flow metering function, which is mainly controlled by the control nozzle outlet size and small gas pressure differences across the nozzle. The diameter of the sprue channel can then be sized to optimize the sprue material velocity for the pressure sealing function. As is thoroughly discussed in the co-pending basic Kinetic Extruder patent application entitled "The Kinetic Extruder—A Dry Pulverized Solid Material Pump," this sizing depends mainly on the pressure, the permeability of the feedstock, and the flowrate required. The sprue channel outlet diameter is always greater than the control nozzle outlet diameter, typically much greater. Without a separation of the sealing function from the metering function, which is accomplished by this sprue/control nozzle combination, the machine simply will not function.

It is further found that small gas pressure differences between the control nozzle interior and the rotor exterior can have a large effect on the rate of solids flow through the control nozzle outlet. Positive differences increase the solids flow and negative differences reduce or stop the flow. By independently controlling the control nozzle internal gas pressure, the overall solids feed rate through the rotor may be controlled and adjusted over a wide range. The control nozzle pressure control is achieved by varying the pressure of a gas flow ("control gas") which is introduced into the control nozzle via a system of passages in the rotor and shaft. The control gas originates from an external supply and its pressure is set and adjusted by conventional means, such as a differential pressure controller, so that the nozzle pressure difference, and thereby the solids feed rate, may be directly controlled.

BRIEF DESCRIPTION OF DRAWINGS

FIG. 2 is an enlarged view of the Kinetic Extruder rotor of FIG. 1.

FIG. 3 shows a pictorial view of the configuration of the flowing solids inside the sprue control nozzle structure.

FIG. 4 shows experimental coal pumping test data for a Kinetic Extruder using the throttleable control nozzle invention.

FIG. 5 shows a partial vertical view, with portions broken away, of the Kinetic Extruder Rotor; showing the details of the sprue inlet configuration, the two sprue sections, the control nozzle structure, and the nozzle pressure control passages.

FIG. 6 gives a sectional view of the Kinetic Extruder Rotor of FIG. 4.

FIG. 7 shows a detail drawing of a throttleable control nozzle and sprue structure.

FIG. 8 shows a conical control nozzle shape with a cone half angle of 16°.

FIG. 9 shows a non-conical control nozzle with a wall slope which increases toward the distal end.

BEST MODE FOR CARRYING OUT THE INVENTION

Figure 1:
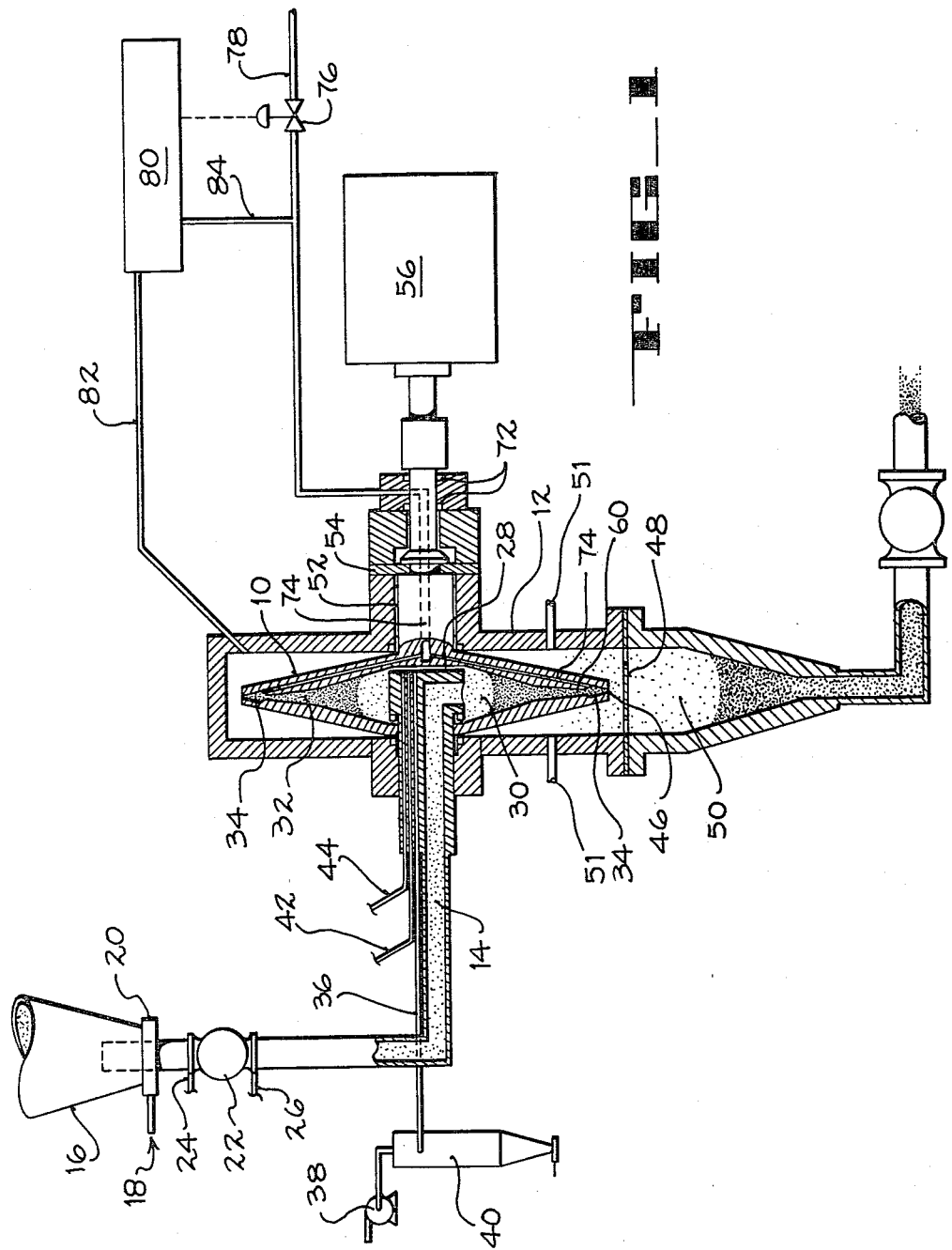
FIG. 1 is a partial vertical sectional view, with portions shown diagrammatically, of a Kinetic Extruder material pressurizing system embodying the present invention for "throttling" the feeding of pulverized or powdered material to a pressurized container.

In FIG. 1 and FIG. 2 there is shown, for purposes of illustration, a partially schematic representation of a solids pressurizing system incorporating the present invention in the system covered in co-pending applications Ser. No. 188,047 and Ser. No. 32,651 now U.S. Pat. No. 4,265,580. The pressurized solids may be destined for some chemical process vessel, such as a coal gasification reactor. Coal gasification requires that the pressure within the reactor be maintained at elevated pressure, for example 30 atm. Such pressures have made the feeding of coal to the process difficult and expensive.

In the illustrated embodiment, the feeder of our invention is a rotor 10 positioned within the pressurized rotor case 12. The exact configuration of the case is a matter of choice and design so long as the process gas pressure is maintained external to the rotor.

The material feeder comprises a stationary feed pipe 14 for receiving material from a feed hopper 16. The feed hopper is fluidized in a conventional manner by gas injection 18 via a distribution plate 20 at the bottom of the solids bed. A normally open valve 22 may be positioned between the feed hopper and the stationary feed pipe 14. The valve 22 is used only during startup and shutdown of the machine. The feed pipe 14 is equipped with purge taps 24 and 26 on either side of valve 22 to clear any compacted solids from the pipe before start up and after shutdown.

The downstream end of the feed pipe comprises a non-rotating inner hub 28 in the rotor and contains a 90° bend in the feed tube to allow the solid material to enter the spin-up zone 30 in a radial direction.

The rotor 10 encloses the spin-up zone and inner hub and includes a number of radial flow channels each consisting of a sprue section 32 followed by a control nozzle section 34. The spin-up zone 30 comprises the annular space between the inner hub 28 and the entrance ends of the sprues.

The spin-up zone 30 is maintained at a lower gas pressure than the feed hopper pressure by vent tube 36, which is connected to a vacuum blower 38 through a dust filter 40, or any other well-known means for maintaining low pressure. The suction typically maintains a pressure of about −2 psig to −5 psig in the eye region of the rotor. This assures a continuous feed of material into the rotor from the atmospheric feed hopper. The type of flow through the feed pipe is known as dense phase pneumatic transport. The material is fluidized but is maintained at a relatively high density, approximately 0.3 to 0.4 gms/cm$^3$ (20 to 25 lbs/ft$^3$), in comparison to the more common dilute phase pneumatic transport. This type of feed gives large mass fluxes with little transport gas and thereby minimizes the required diameter of the feed pipe.

Within the spin-up zone, 30, the coal is accelerated to the rotor angular velocity and compacted to a density of 0.6 to 0.8 gms/cm$^3$ (40–50 lbs/ft$^3$) before entering the sprues 32. The coal is non-fluidized in the sprues and flows therein as a porous compacted plug of granular solid material. The plug must be held in the sprue by an excess of centrifugal force over the gradient in gas pressure in the porous medium which tends to oppose the motion of the plug. Design of the sprue for favorable gas pressure distributions in the plug is rather complex but is thoroughly discussed in co-pending application Ser. No. 188,047. The shaded areas in FIG. 1 indicate the portions of the machine which run filled with coal during feeding-light shading for low density fluidized coal, heavy shading for compacted coal. The compaction process in the spin up zone produces gases which must be drawn out of vent 36 in order to maintain a low pressure in the eye of the rotor. The vent also removes any gases leaking through the sprue plug from the high pressure region.

Additional secondary channels communicating with the rotor eye region via the inner hub are a pressure tap 42 and a flushing gas line 44. The pressure tap is used to monitor the rotor eye pressure in order to warn of abnormal conditions such as the loss of a solids plug in the sprues, i.e., a blowback, which would require the unit to be shut down. The flushing gas is a small gas flow into the rotor eye which assures the suction vent channel always has a minimum gas flow through it. Without this flow a relatively dense stream of solids can be drawn into the suction line under certain conditions leading to a chance of line plugging. The flushing gas flow rate can either be a fixed quantity or it can be regulated according to the rotor eye pressure.

Coal exits the rotor through a plurality of control nozzle outlet holes 46 into the pressurized rotor case. Surrounding the rotor during operation is a dilute suspension of solids. A vortex is set up in the case by the spinning rotor and during feeding the solids rapidly drift radially outward and through the slotted baffle 48, into an accumulator section 50 making up the lower portion of the case. Therein the solids may be settled and transferred via a conventional pneumatic pick-up system, or other means, to a reactor or another high pressure hopper. Pressurizing gas is fed into the case 12 at port 51 from any conventional supply.

The rotor is supported on shaft bearings 52 and thrust bearing 54 and driven by drive motor 56, or any other conventional drive means. The rotating seals 58 seal the rotor shaft and feed pipe inside and outside the rotor.

FIG. 3 illustrates the functioning of the control nozzle. This shows a portion of the sprue channel 32, including its distal end 33 in conjunction with the control nozzle 34. The moving compacted solids 60 within the sprue channel and control nozzle are denoted by the shaded area. The control nozzle outlet 46 in the rotor rim 62 is the narrowest point in the flow channel and acts as the choke point for the moving plug of solids. The coal egressing from the sprue forms a cone shaped free surface 64 according to the material angle of repose, α, leaving a coal free, gas filled, space 66 above the solids. In the non-throttleable embodiment of the control nozzle described in co-pending patent application Ser. No. 188,047, this space is connected to the rotor surrounding via a port so the gas pressure within the control nozzle (P$_2$) is the same as the delivery pressure ($P_3$). Under this condition (i.e., $P_2 = P_3$) it is found that the mass flow rate through the nozzle is only dependent on the nozzle outlet diameter, d, and the rotational speed or g-force, according to the equation:

$$m = Cd^{5/2} G^{\frac{1}{2}}$$

where m = nozzle mass flow rate (Kg/sec)
d = outlet diameter (cm)
G = Centrifugal acceleration (g's) = $rw^2/g$
r = rotor radius, w = rotor angular speed
C = empirical constant = 0.014 Kg/sec/cm$^{5/2}$ from tests with coal.

It may be noted that since the rotor speed can be varied, some variation in mass flow can be achieved by this "non-throttleable" configuration. However, this method is of limited effectiveness since a minimum speed is required to maintain the sprue plug against the gas back pressure, and power requirements increase rapidly with higher speeds therefore, only a relatively narrow operating speed range is really practical for the machine.

The function served by the "non-throttleable" control nozzle is basically to meter the material flow and to stabilize the flowing material plug in the sprue. Up to a certain limiting pressure, the control nozzle runs full and the throughput is independent of delivery pressure, being only a function of rotor speed as given above. Under conditions where the centrifugal force is insufficient in comparison to the sprue pressure gradient, and the maximum mass flow which can be delivered by the sprue is less than m, the control nozzle "starves." That is, material is not supplied to the nozzle fast enough to maintain a back-up of material within the nozzle which extends to the distal end of the sprue. This lack of back-up material removes the distal support to the material plug in the sprue. If this occurs, it has been found experimentally that the material plug in the sprue is unstable, and flow stoppages, or even "blowbacks" of high pressure gases into the rotor due to a complete loss of the integrity of the sprue plug, can be the result.

After exiting the nozzle outlet hole in the rotor rim, the solid material forms a plume 68 which is blown tangentially back along the rotor periphery due to the motion of the rotor with respect to its gaseous environment. The radial velocity of the coal passing through the nozzle outlet is normally quite low in comparison to its tangential velocity which is the rim speed of the rotor (e.g., 15 m/sec vs. 150 m/sec).

In the present throttleable embodiment of the control nozzle, the control nozzle gas inlet passage 70 is connected to a controlled pressure supply via passages through the rotor and shaft. This allows the gas pressure within the control nozzle ($P_2$) to be independently controlled and adjusted to be either greater or less than the pressure $P_3$, external to the rotor. The control nozzle solids throughput is then given by $$m_t = Cd^{5/2} \left[ \frac{rw^2 + \frac{1}{j} - \left(\frac{dp}{dr}\right)_o}{g} \right]^{\frac{1}{2}}$$

where $m_t$ = nozzle mass flow rate for throttleable embodiment $\left(\frac{dp}{dr}\right)_o$ = gas pressure gradient in solids near the outlet of the control nozzle j = solids bulk density within control nozzle This equation expresses the combined effects of centrifugal forces and gas pressure forces on the flow rate through the nozzle outlet.

The magnitude and a sign of $(dp/dr)_o$ above is proportional to the overall pressure difference ($P_2 - P_3$) across the control nozzle. The pressure gradient adds to the body force and $m_t$ will be higher than the isobaric value, if $P_2$ is greater than $P_3$. Similarly, if $P_2$ is less than $P_3$, $(-dp/dr)_o$ subtracts from the G-force and the solids flow rate will be reduced.

Due to the highly convergent shape of the control nozzle, in comparison to the sprue, relatively significant outlet pressure gradients can be induced with quite modest control pressure differences (e.g., $P_2 - P_3 = 1$ to 3 atm.) The effective delivery pressure for the sprue channel is therefore only slightly changed by this means of throttling the control nozzle throughput.

Test data for a kinetic extruder rotor equipped with this throttling system is presented in FIG. 4. There is plotted the throttling ratio $m_t/m$ as a function of the control nozzle pressure difference ($P_2 - P_3$). Here the throttling ratio is defined as the rotor solids throughput divided by the throughput that is achieved when the control nozzle is isobaric ($P_2 = P_3$). The feedstock was a 70% passing 200 mesh coal grind. The rotor was 71 cm in diameter and the rotor speed was approximately 3000 RPM and was not varied significantly in the tests.

The FIG. 4 data clearly demonstrates the effectiveness of the throttling system. An overall range of 3:1 in feed rate was achieved over a control pressure difference range of -0.7 to +1.4 atm. Furthermore the data verified that the throttling effect is sensitive only to the control nozzle pressure difference ($P_2 - P_3$) and not sensitive to the absolute value of the delivery pressure ($P_3$).

As shown in FIG. 1 and FIG. 2 the gas flow into the control nozzle ("control gas") enters via a pair of shaft seals 72 and is channeled to the control nozzles through a system of passages 74 in the rotor and shaft. So long as the rotor is feeding coal there is always a positive flow of control gas into the control nozzles. The rate of control gas flow always closely corresponds to that flow necessary to pressurize the interstices in the bulk solids delivered by the sprue up to the control nozzle pressure. For a typical control nozzle solids bulk density of 720 Kg/m$^3$ at 50% porosity, this would correspond to $0.50/720 = 6.9 \times 10^{-4}$ m$^3$ gas/Kg solids. Assuming the control nozzle pressure was 30 atm, this would be a flow of approximately $30 \times 6.9 \times 10^{-4} = 0.021$ normal cubic meters per hour of control gas per Kg/Hour solids feed rate.

Control of the control pressure difference, $P_2 - P_3$, is achieved in any conventional manner such as by control valve 76 on the control gas supply line 78 (gas supply not shown) and differential pressure controller 80, as shown in FIG. 1. The differential pressure controller having pressure taps 82 and 84 to the rotor case ($P_3$) and the control gas line ($P_2$). As discussed, the rate of solids mass flow through the Kinetic Extruder is adjusted by adjusting the control pressure difference $P_2 - P_3$. Adjustments of the pressure controller may be manual or automatic via feedback loops.

FIGS. 5, 6, and 7 show details of the Kinetic Extruder rotor construction. As shown, the sprues and the control nozzles are made as replaceable parts, with the sprues in two sections. This allows these parts, which are exposed to abrasive type wear, to be conveniently made from hard wear resistant materials. It also allows the rotor to be more easily reconfigured to accommodate major changes in requirements—i.e., major changes in required throughput range, delivery pressure, or feedstock permeability. Often this can be accomplished by changing just the control nozzles and the second (outlet end) section of the sprue. As shown in FIGS. 5 and 6 and in the sprue/control nozzle assembly detail drawing represented by FIG. 7, the sprues consist of a funnel section 90 in conjunction with sprue body sections 92. The control nozzles 34 are held against the distal end of the sprue body section by the nozzle retaining blocks 94 which are attached to the rotor 10 by screws 96. Control gas passages include the series of channels, 98, 100, and 102 which connect to the control nozzle interior. O-ring seals 104 seal between the sprue sections and between the sprues and the rotor. A gasket 106 is used to seal between the sprue and the control nozzle.

FIG. 7 shows the detail assembly for the throttleable control nozzle structure. The control gas is introduced into the control nozzle via internal passages 98, 100 and 102 in the rotor. In the assembly design shown, these passages include, as a manufacturing convenience, an annular section around the sprue. In another embodiment of the design, (not shown) a porous metal filter plate is used at the distal end of the control gas inlet passage 102 to forestall any possibility of coal entry into the control gas passages.

Actual design of a Kinetic Extruder machine to particular requirements of tons/hr., delivery pressure, and feedstock properties, involves tradeoffs between sprue length, sprue area, area ratio and profile, and rotational speed. Generally, one has to optimize in terms of power requirements. The major power sink has been found to be due to aerodynamic drag on the rotor spinning at high speed in a high pressure gas. This power requirement has been found to be given by $$\text{Power} = C j_g w^3 r^5$$

where C=a constant depending on rotor surface finish and thickness ratio
  $j_g$ = density of the gas the rotor runs in
  w = rotor angular speed
  r = rotor radius.

Based on power considerations, the control nozzle should be made as short as possible, since it adds to the rotor radius without any change in the length of the sealing sprue plug and hence leaves the rotor speed requirement unchanged. Since power goes as $r^5$, optimization is important if power requirements are to be reasonable.

The proximal end of the control nozzle must have a somewhat larger diameter than the distal opening of the sprue so as to give a clear location for control gas injection and provide a free solids surface of sufficient area to allow the gas to permeate freely into the solid material. Given the sprue diameter, the control nozzle is then mainly determined by its cone angle. This angle should be made as large as possible while still obtaining sliding solids flow along the nozzle walls. The critical angle of slide for coal is about 20° corresponding to a maximum allowable nozzle half angle of 20°. Currently, conical control nozzle half angles of 16° are used as a reasonably safe compromise between power requirements and coal sticking problems. Such a nozzle is shown in FIG. 8.

Some improvement, that is nozzle shortening, may be gained by using nozzle shapes which are more complex than cones. It is found that granular sliding flow can be obtained at greater wall angles in close proximity to the outlet hole can be then obtained far upstream from the outlet hole. Favorable control nozzle designs are therefore ogive or partial paraboloid-like shapes, with greater wall angles near the distal end of the nozzles than at the proximal ends.

FIG. 9 shows an example of this type of control nozzle design with a 30° wall angle at the distal end 106, fairing to a 16° wall angle at the proximal end 108. Comparison with FIG. 8 shows that for the same area contraction from the proximal end 108 to the distal end 106, the FIG. 9 nozzle is approximately 30% shorter than the simple 16° conical nozle. As discussed, shorter nozzles result in lower power requirements for the Kinetic Extruder.

Other modifications and advantageous applications of this invention will be apparent to those having ordinary skill in the art. Therefore, it is intended that the matter contained in the foregoing description and the accompanying drawings is interpreted as illustrative and not limitative, the scope of the invention being defined by the appended claims.

We claim:
1. Apparatus for the control continuous feeding of relatively fine particulate material into a high pressure container, comprising:
   a rotor having a central hub and a plurality of sprues providing a passageway through which the particulate material is passed,
   each of said sprues extending radially outward from an inner periphery of said rotor to terminate adjacent to a control nozzle at the periphery of the rotor,
   the sprue at the section adjacent the termination having a low angle of convergence and the nozzle having a substantially greater angle of convergence, and
   variable pressure means connected to said control nozzles at a location radially outward from and adjacent to said sprue for varying the gas pressure within said control nozzles to thereby adjust the flow rate of the particulate material.

2. The apparatus for the control of the continuous feeding of relatively fine particulate material into a high pressure container as set forth in claim 1, wherein:
   said variable pressure means includes a gas receiving space adjacent to said sprue and connected to the control nozzle.

3. The apparatus for the control of the continuous feeding of relatively fine particulate material into a high pressure container as set forth in claim 2, wherein:
   said variable pressure means includes a central, gas plenum defined by the hub of said rotor and conduit means connecting said central gas plenum to said gas receiving space.

4. The apparatus for the control of the continuous feeding of relatively fine particulate material into a high pressure container as set forth in claim 3, wherein:

said variable pressure means includes a pressure regulator and control system.

5. The apparatus for the control of the continuous feeding of relatively fine particulate material into a high pressure container as set forth in claim 1, wherein the diameter of the distal opening of said control nozzle is between 2 millimeters and 12 millimeters.

6. The apparatus as set forth in claim 1, wherein said control nozzle includes a passageway through which the particulate material is passed and wherein said nozzle passageway is substantially cone shaped, having a half angle less than the critical angle of slide.

7. The apparatus as set forth in claim 1, wherein said control nozzle includes a passageway through which the particulate material is passed and wherein said nozzle passageway has a greater wall angle at its distal end than at its proximal end.

8. The apparatus as set forth in claim 1, 4, 5, or 7, wherein said nozzle passageway has an ogive shape.

9. The apparatus as set forth in claim 7 wherein the wall angle at the distal end is approximately 16° and the wall angle at the proximal end is approximately 30°.

10. The apparatus as set forth in claim 8 wherein the wall angle at the distal end is approximately 16° and the wall angle at the proximal end is approximately 30°.

* * * * *